Sept. 6, 1966 R. THOMAS 3,270,411
METHOD FOR PREPARING AND GIRTH WELDING PIPE ENDS
Filed April 22, 1963 3 Sheets-Sheet 1

Robert Thomas
INVENTOR.

BY Browning, Simmons,
Hyer & Eickenroht
ATTORNEYS

Sept. 6, 1966  R. THOMAS  3,270,411
METHOD FOR PREPARING AND GIRTH WELDING PIPE ENDS
Filed April 22, 1963  3 Sheets-Sheet 2
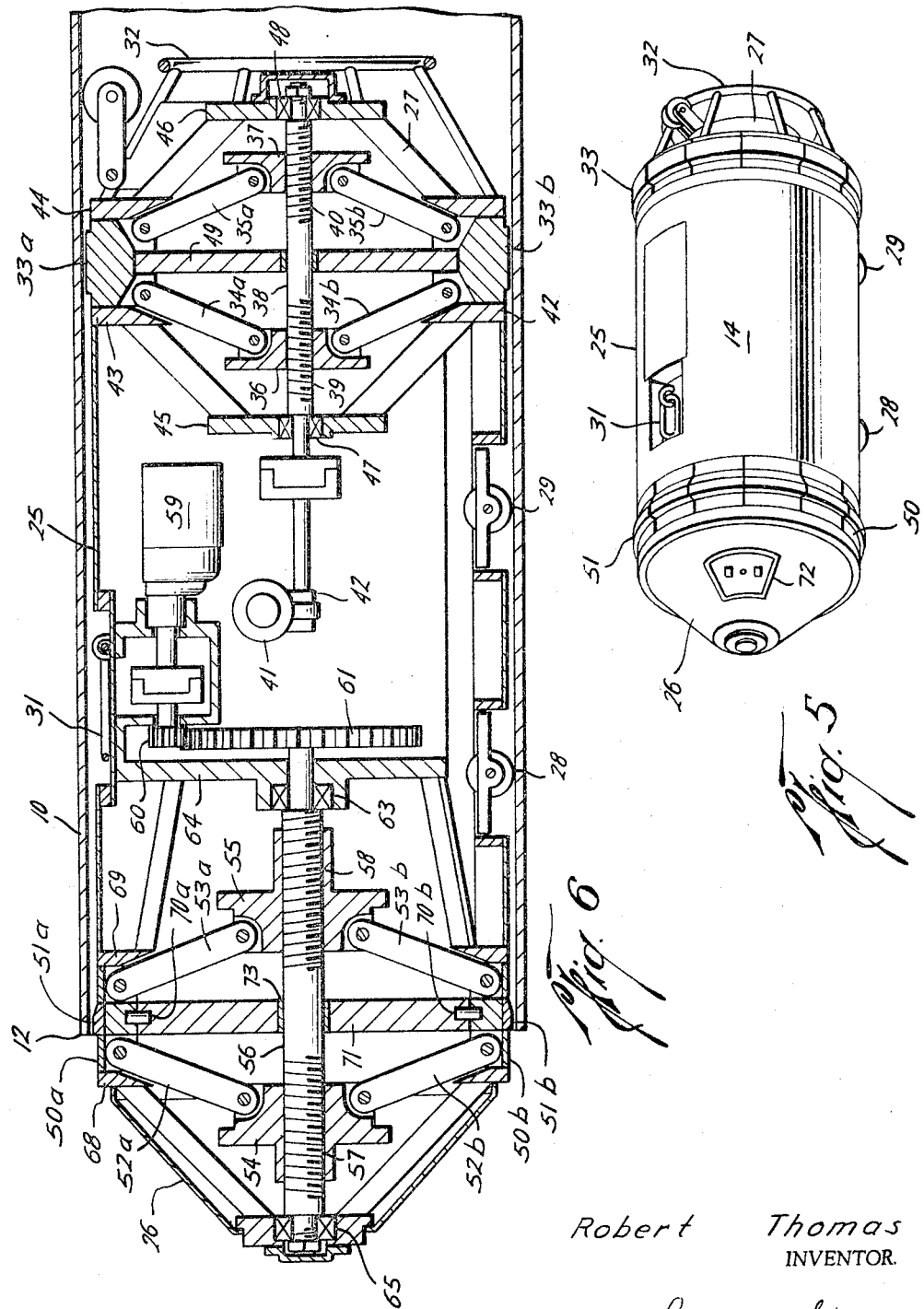
Robert Thomas
INVENTOR.
BY Browning, Simms
Hyer & Eickenroht
ATTORNEYS Sept. 6, 1966 R. THOMAS 3,270,411
METHOD FOR PREPARING AND GIRTH WELDING PIPE ENDS
Filed April 22, 1963 3 Sheets-Sheet 3

Robert Thomas
INVENTOR.

BY Browning, Simms,
Hyer & Eickenroht

ATTORNEYS

United States Patent Office 3,270,411
Patented Sept. 6, 1966

3,270,411
METHOD FOR PREPARING AND GIRTH WELDING PIPE ENDS
Robert Thomas, Houston, Tex., assignor to American Machine & Foundry Company, New York, N.Y., a corporation of New Jersey
Filed Apr. 22, 1963, Ser. No. 274,722
7 Claims. (Cl. 29—471.1)

This invention relates to a method of preparing and girth welding the ends of pipe together after the pipe has been strung along a pipeline right-of-way wherein at least some of the adjacent ends have girths of such different sizes that the ends cannot be matched together to permit a satisfactory welded joint to be made.

When line pipe is delivered to the pipeline right-of-way, each joint is laid along side the ditch in roughly the position it will occupy in the completed line. After the pipe is thus strung, a joint-preparation crew travels down the right-of-way cleaning and buffing the ends of the pipe preparatory to their being welded together. Then successive joints are lifted and spotted over the ditch, aligned with the last joint in the line and then welded thereto.

The daily operating cost of a pipeline spread, which lays the pipe, is tremendous and it is very important that it operate at maximum speed and that all the various operations be coordinated so that none of them will delay the others.

One cause for delays in such operations arise out of the variations encountered in the outside and inside diameter of the pipe. Thus, the adjacent ends of the joints to be welded together must match within a certain diametric tolerance in order that they can be welded. If one end is excessively oversized with respect to the other end, the offset may be too much to tolerate.

In any event when mismatched joints are encountered it is the present practice to shift the joints around until they are matched or to cut off the end of the larger girth pipe where the oversize is caused by belling of the end. Either alternative is costly.

The difference of girths at the pipe ends may arise from several sources. First, there may be poor control and inspection at the mill so that the girth dimension does not meet code specifications. Second, the code specifications have sufficiently broad tolerances that even pipe meeting these specifications may be so mismatched that welding is difficult. Thus, one pipe end may be near or at the maximum girth tolerance and an adjacent end may be near or at a minimum girth tolerance.

One reason why overly mismatched ends cannot be welded is because the line-up clamp cannot perform its task. In the welding operation, a line-up clamp is inserted in the pipe to simultaneously engage the inside walls of the two joints and hold the ends of the pipe in abutting relationship so they can be properly welded together. These lineup clamps are expansible members which are capable of exerting only sufficient force on the pipe to overcome any misalignment caused by either or both ends of the pipe being out-of-round. In other words, if one end is out-of-round, the line-up clamp can force it into round and into alignment with the other end and hold the two in alignment until they are welded together. Slight variations in the inside circumference of the pipe usually do not prevent the line-up clamp from aligning the ends sufficiently for a satisfactory hand weld to be made. However, where the variation is sufficient to prevent the line-up clamp from adequately engaging both joints, the pipe cannot be aligned properly and a satisfactory weld cannot be made, either by hand or by an automatic welding machine.

Another reason why mismatched joint ends is becoming an increasing problem arises from the advent of automatic welding machines. To most fully realize the benefit of these machines and their superior welds, it is highly desirable that the inside surface of the pipe ends be as flush as possible when aligned for welding. Not only does this promote an efficient weld, smooth on the inside of the pipe, but also facilitates the welding operation. These machines are used on internal line-up clamps having shoes which include a ring of highly heat conducting material, such as copper, to bridge across the joint and dissipate the welding heat. Since copper is relatively soft, any excessive difference in diameter between the pipe ends would result in an offset which would tend to mar the face of the copper ring. Also, the copper could not make good contact with the larger end in order to effectively conduct heat therefrom. The variation in end diameters does not have to be great before difficulties arise. For example, in pipe with an outside diameter of 30 inches and a wall thicknesss of .360 inch, a difference in the average inside diameter of the pipe of about 0.040 inch is usually all that can be accommodated. (Average diameter is used here and is meant whenever "diameter" is used throughout the specification because very few pipe joints are exactly round and their diameter in one direction will probably not equal their diameter measured in another direction. For this reason, the average diameter of the end of the pipe is best determined by measuring its circumference and dividing by pi.)

This problem is becoming more acute as a result of the increased diameter of the pipeline being built, plus the fact that line pipe is now being made from metals having high yield strengths which allow the wall thickness of the pipe to be reduced. For example, it is quite common these days for line pipe to have a yield strength of 65,000 p.s.i., whereas most line pipe a few years ago had a yield strength of only 42,000 p.s.i. It is expected that future line pipe will be available with a minimum yield strength of 110,000 p.s.i. and even higher.

It is highly desirable to reduce the wall thickness of the pipe since it reduces the tonnage of steel required for the pipeline. Reducing the wall thickness of the pipe, however, makes it necessary to more accurately align the ends of the pipe before they can be satisfactorily welded, which just compounds the problem previously described in connection with the variation on the diameter of the pipe sections.

It is an object of this invention to provide a method of preparing and girth welding ends of pipe wherein a satisfactory weld can be made despite the ends having different internal diameters such as would normally prevent welding.

It is also an object to provide a method of preparing the ends of a plurality of pipe joints strung along a pipeline right-of-way which allows them to be welded together in the order that they were strung regardless of substantial differences in their internal diameter.

Also, there is a problem of welding together two joints of pipe having the same nominal outside diameters but different wall thickness schedules. For example, a thicker walled pipe is inserted in a pipeline for road crossings, river crossings, etc., which require short sections of extra strong pipe for safety and other purposes. To avoid forming an annular internal shoulder where this thicker walled pipe is inserted in the line, it is common practice to employ what is known as a transition joint which has the same nominal outside diameter as the joints it joins at each end, but has a thinner wall thickness at one end equal to the wall thickness of the thinner walled pipe at the end, and a thicker wall thickness at the other end equal to that of the thicker walled pipe at the other end. In other words, its inside diameter increases from one end to the other so that there is a gradual taper from the thicker wall section to the thinner.

The transition joints are very expensive since they must be machined to provide this tapered bore, and it is another object of this invention to eliminate the need for these specially prepared transition joints by providing a method for preparing the ends of two cylindrical members having equal outside diameters and different wall thicknesses so that they can be welded together without producing an abrupt change in the internal diameter of the line, i.e., they will have an internal flush joint.

Other objects, features and advantages of the invention will be apparent to one skilled in the art from a consideration of the specification, claims and attached drawings, wherein:

FIG. 5 is an isometric view of the expander shown in FIG. 2 which is one of the types of expanders which can be used to practice the method of the invention;

FIG. 6 is a cross-sectional view taken through the expander of FIG. 5 illustrating its inner construction;

Figure 1:
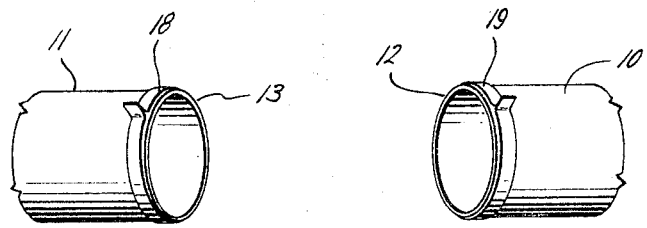
FIG. 1 illustrates one method of determining which of the two ends to be welded together has the small outer circumference and whether it is sufficiently smaller than the other that the two ends cannot be satisfactorily welded together.

The invention is illustrated in the drawings in connection with the welding together of two joints of pipe as in pipeline construction since this is where the invention has particular utility.

After the pipe has been strung along the right-of-way, it is common practice to have a joint-preparation crew precede the welding crew to clean and buff the ends of the pipe so they can be welded together without delay. This crew can be conveniently used also to practice the invention and thus insure that the inside diameter of the abutting ends of the pipe which are to be welded together are sufficiently equal to allow welding.

Figure 2:
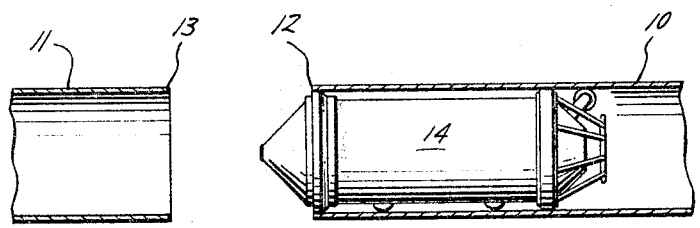
FIG. 2 illustrates the step of expanding the end with the small circumference until the circumferential difference between the two ends is reduced sufficiently to allow them to be welded together satisfactorily.

To prepare the pipe ends for welding, two steps are involved. First, the ends are measured to determine if either needs expanding and, second, the smaller end is expanded beyond the elastic limit of its metal so that it takes a permanent set at the proper matching diameter. These steps are shown in FIGS. 1 and 2. FIG. 1 shows the measuring of the outside circumference of the ends 13 and 14 of the two joints of pipe 10 and 11. The outside circumference of the pipe is shown being measured or "strapped" by measuring tapes 18 and 19. This strapping technique allows accurate measurement of average outside diameter for both in-round and out-of-round pipe. Of course, the strap length (circumference) can be converted rather simply to average diameter by computation. While in most cases, the important dimension is the average inside diameter, it is much more difficult to measure the inside circumference of the pipe than the outside circumference and, to arrive accurately at the average inside diameter, the wall thickness can be gaged at each end, doubled and subtracted from the computed average outside diameter. In many cases, however, a simple comparison of strap lengths will suffice to determine if one end is too small relative to the other end.

Assume that the difference in the inside circumference of the ends of the pipe is excessive such that the line-up clamp cannot operate properly and a satisfactory weld cannot be obtained. Then in accordance with this invention, the end of the pipe with the smaller inner circumference is expanded with force sufficient to yield the pipe wall, i.e., sufficient to cause the pipe metal to exceed its yield point. This yielding and consequent enlarging of the pipe end is continual until the end of the pipe has an average inner diameter, any springback being taken into consideration, to match within tolerance the average inner diameter of the other pipe end 13.

Figure 3:
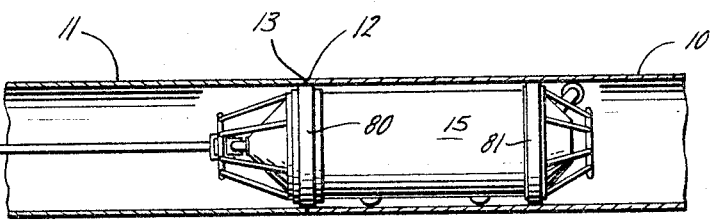
FIG. 3 illustrates a line-up clamp holding the ends in position for welding.
Figure 4:
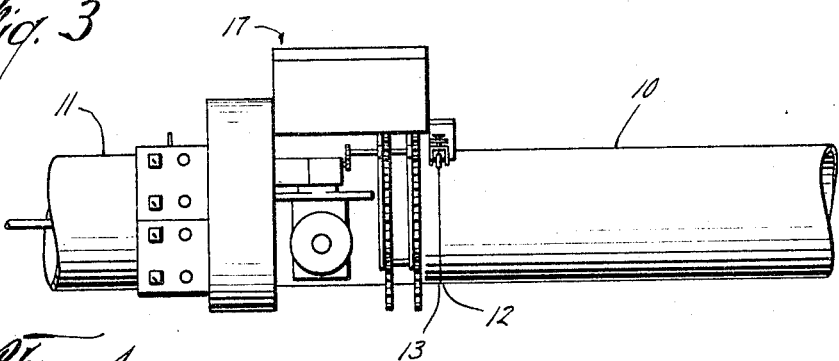
FIG. 4 shows an automatic welding machine in position to weld the two joints together.
Figure 7:
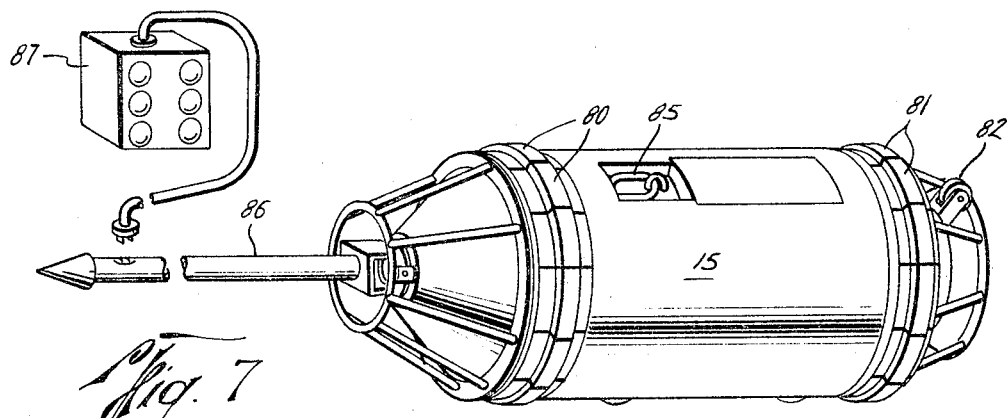
FIG. 7 is an isometric view of one of the types of line-up clamps used to line up the two sections of pipe being welded together.
Figure 8:
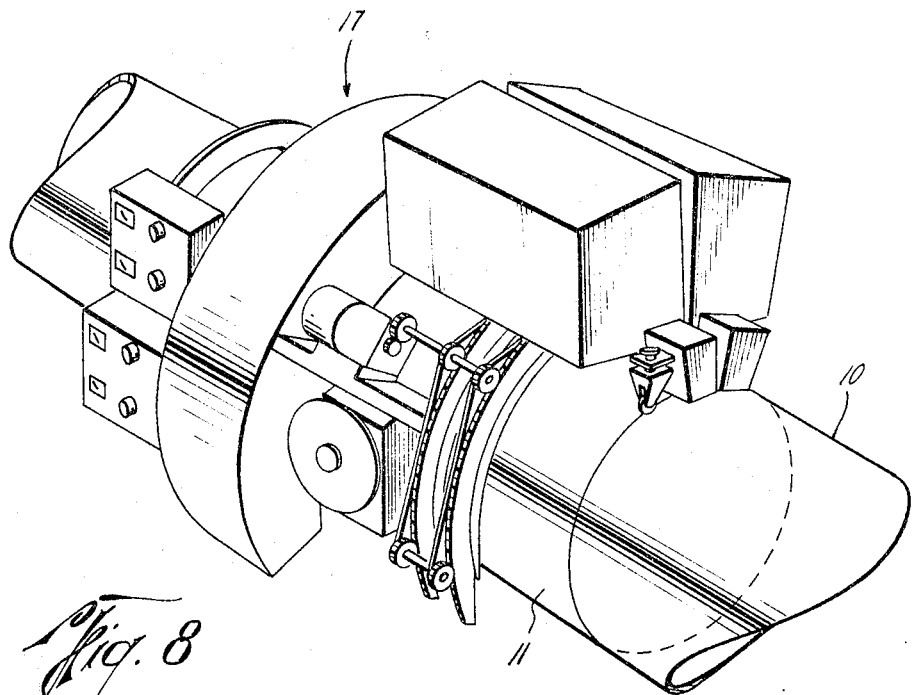
FIG. 8 is an isometric view of an automatic welding machine in place in position to weld together the ends of the two pipe sections.

FIGS. 3 and 4 show the welding operation using a line-up clamp 15. In FIG. 3, the clamp is in place holding the ends 12 and 13 in alignment which it can now do because the end 12 has been expanded to have approximately the same inner circumference as the end 13.

In FIG. 4, the ends are being welded together by means of the automatic welding machine illustrated generally by the number 17.

To practice the invention, means are provided to expand the end of the pipe which are capable of exerting sufficient force to exceed the yield strength of the pipe.

FIGS. 5 and 6 illustrate one embodiment of an expander which can be used in the practice of the invention. It has a cylindrically shaped housing 25 which is equipped with conical ends 26 and 27. Bottom rollers 28 and 29 are attached to the housing to facilitate moving the expander into the pipe section.

A ring pin 31 is attached to the upper side of the housing at approximately the center of gravity of the expander so it can be easily handled with a hoist line.

Located adjacent end 27 of the housing are expandible stabilizing means which serve to center the expander in the pipe and hold it against movement during the expanding operation. In the expander illustrated, the stabilizing means consist of a plurality of stabilizer shoes 33 (FIG. 5) which are individually mounted on a plurality of links. A portion of this arrangement is shown in FIG. 6, wherein shoes 33 and 33b are carried by links 34a, 35a, 34b and 35b. It will be understood that there will be a pair of links for each of the shoes shown in FIG. 5. The links are all pivotally connected to the shoes 33 and also to nuts 36 and 37 to provide a toggle mechanism to move the shoes radially outward and inward with the longitudinal movement of nuts 36 and 37. The nuts are moved longitudinally by lead screw 38 which is equipped with right hand and left hand thread sections 39 and 40 which engage right and left hand threads on nuts 36 and 37 and moves the nuts either away from or toward each other, depending on the direction of rotation of the lead screw.

Powering the stabilizing means is electric motor 41 which drives lead screw 38 through gear box 42. The electric motor is reversible so the lead screw can be driven in either direction. Guides 43 and 44 are connected to housing 25 and serve to laterally support shoes 33 and to restrain them against all but radial movement. These guides also support members 45 and 46 in which bearings 47 and 48 are located, which in turn rotatably support lead screw 38. A disc shaped member 49 is located within the shoes to guide the shoes as they move radially inward and outward and also to provide a stop to limit their inward travel. Their outward travel is limited by the pipe section in which they are located.

In the other end of the expander, means are provided to expand and yield the end of the pipe. These expanding means, in the embodiment illustrated, operate on the same toggle principle as the stabilizing assembly just described. However, since their purpose is to hield the end of the pipe section which they engage, they must exert a much greater force on the wall of the pipe than does the stabilizing mechanism so there are structural differences between the two mechanisms beside the fact that this one has to be built out of larger and stronger force transmitting members.

This pipe expanding mechanism is equipped with a plurality of shoes 50, the two illustrated being designated as 50a and 50b. These shoes do not engage the pipe walls themselves but carry a die member 51 for that purpose. The dies are preferably made from hardened steel having a surface hardness and a yield strength higher than that of the pipe. Shoes 50 (FIG. 5) are carried by a toggle mechanism consisting of links, some of which are illustrated as 52a, 43a, 52b and 53b (FIG. 6). The links are pivotally connected to the shoes and to nuts 54 and 55 which are mounted on lead screw 56. The lead screw is here again provided with both right and left hand threads 57 and 58 to mate with right and left hand threads on nuts 54 and 55 to move the nuts either toward and away from each other, depending upon the direction of rotation of the lead screw. Driving the lead screw through gear 61 and pinion 60 is electric motor 59. Both this electric motor and the one controlling the stabilizing assembly can be remotely controlled from the instrument panel 72 mounted from the front end of the expander as shown in FIG. 5.

Guide members 68 and 69 and guide pins 70a and 70b are provided to prevent lateral movement of shoes 50 as the shoes are moved radially. Pins 70a and 70b are mounted in a disc shaped member 71 which is supported on shaft 56 by bearing 73. The member 71 also serves to limit inward travel of the shoes.

Lead screw 56 is rotatably supported by bearings 63 and 65 which act both as radial and thrust bearings for the lead screw. Theoretically, of course, there should be no end thrust present in the lead screw since the lateral force exerted on nut 54 should be equal and opposite to the force on nut 55. However, in case there is a slight unbalance of horizontal forces, the thrust bearing is provided.

As stated above, the expander means are constructed with much stronger and larger members than the stabilizing means in the other end of the expander. This is necessary since the expander means must provide sufficient force to exceed the yield strength of the pipe and permanently deform the end of the pipe.

The width of dies 51 should be sufficient to insure that a substantial portion of the pipe at its end is actually expanded radially and not simply flared outwardly. In other words, the end faces of the pipe after expansion should be in the same angular relationship with respect to a diametrical plane through the pipe as it was before expansion. This will avoid refacing the end after expansion to obtain the proper weld bevel. The discs are also provided with a chamber on one end to radius the pipe from its original diameter out to the expanded diameter to avoid forming an abrupt internal shoulder in the pipe.

In operation, when the end of a joint of pipe, as for example end 12 of pipe 10, has been measured and found to be undersize to the extent that it cannot be satisfactorily welded to end 13 of pipe 11, the expander is positioned in the pipe as shown in FIG. 6. Die 51 is located flush with the end of the pipe and shoes 33 of the stabilizing means are expanded into engagement with the pipe to hold the expander in position. Motor 59 is then started and the dies 51 are forced outwardly into engagement with the inner walls at the end 12 of the pipe. The motor, through the toggle mechanism, exerts sufficient force on the dies to yield end 12 out to approximately the size of end 13.

After the pipe has been permanently expanded to the proper circumference, the expander is removed from the pipe section and the internal line-up clamp 15 is installed. This device, an embodiment of which is shown in FIG. 17, looks much like the expander in that it has two sets of expandable shoes 80 and 81 which are arranged to engage the inside of the pipe sections. Both of these expander devices are similar to the stabilizing means used in connection with the expander in that they are not designed to exert sufficient force against the pipe to exceed its yield strength and simply serve to align the ends of the pipe sections for welding purposes.

In operation, the clamp is located as shown in FIG. 3 with shoes 80 engaging the inner surface of both ends of the two joints of pipe. Shoes 81 are expanded to centralize the clamp in the pipe and hold it against movement. Shoes 80 usually have copper inserts to conduct heat away from the weld area as rapidly as possible and to prevent the shoes from being welded to the pipe.

Since the line-up clamp is completely enclosed by the two pipe sections, an extension handle 86 is attached which is long enough to extend out of the end of the pipe section being welded onto the pipeline. This extension 86 allows the clamps to be properly located and also provides an electrical connection between the control box 87 and the electric motors located within the clamp to expand and contract the shoes 80 and 81.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without dperating from the scope thereof, it is to be understood that all matter herein set forth or shown in the accompanying drawings to be interpreted as illustrative and not in a limiting sense.

The invention having been described, what is claimed is:

1. In a method for welding together the adjacent ends of pipe joints which have been strung along a pipeline right-of-way in approximate end-to-end positions, the steps comprising
   measuring adjacent ends of the pipe joints to determine if the diameter of any one of a pair of adjacent ends is sufficiently smaller than that of the other end of said pair that the ends cannot be satisfactorily welded together;
   radially expanding the circumference of any such smaller end by applying sufficient expansive force thereto to exceed the yield of the metal of the smaller end until its diameter is such that it can be welded to said other end; and
   then girth welding said ends together.

2. The method of claim 1 wherein an expander is used to yield said smaller pipe and after which it is removed therefrom and wherein a separate line-up clamp is used to mechanically align said ends during the welding step.

3. In a method for welding together pipe joints which have been strung along a pipeline right-of-way in approximate end-to-end positions, the steps comprising
   measuring the diameter of the pipe joints at the adjacent ends thereof to be welded together to determine whether one such adjacent end is of sufficiently smaller diameter than the other adjacent end that it cannot be welded thereto;
   placing an expander in the end of a pipe joint having a diameter too small to be so welded to an adjacent joint;
   expanding the expander until the yield strength of the pipe joint is exceeded and its diameter at its end is approximately equal to the diameter of the end of the adjacent joint;
   and welding together the ends of the two joints.

4. In a method for welding together the adjacent ends of pipe joints which have been strung along a pipeline right-of-way in approximate end-to-end positions, the steps comprising
   measuring adjacent ends of the pipe joints to determine if the diameter of any one of a pair of adjacent ends is sufficiently smaller than that of the other end of said pair that the ends cannot be satisfactorily welded together; and radially expanding the circumference of any such smaller end by applying sufficient expansive force thereto to exceed the yield of the metal of the smaller end until its diameter is such that it can be welded to said other end.

5. In a method for preparing adjacent ends of pipe joints for welding together wherein said joints have been strung along a pipeline right-of-way and wherein one end is of too small diameter to be welded to the other, the steps comprising measuring the circumference of the ends of two joints which are to be girth welded to determine which end has the smaller diameter;

placing an expander in the end of the joint having the smaller diameter; and stressing the end of smaller diameter section above its yield strength until the diameter of that end is approximately equal to the diameter of the end of the other joint.

6. In a method of welding together the adjacent ends of first and second pipe joints in the laying of a pipeline wherein both joints have the same nominal outside diameter but the first joint has a substantially thicker wall than the second joint such as would normally require a transition joint between them to obtain internally flush welded joints, the steps comprising radially expanding the first joint at its end to be welded to the second joint by applying sufficient expansive force thereto to exceed the yield point of the metal of the first joint;

continuing said expanding until the inner diameter of the first joint is sufficiently near to that of the second joint that the two joints can be welded together to provide an internally flush welded joint; and welding said first and second joints together.

7. The method of claim 6 wherein an expander is used to so expand the first joint after which it is removed therefrom and wherein a separate line-up clamp is used to mechanically align and joints during the welding step.

References Cited by the Examiner

UNITED STATES PATENTS

| | | | |
|---|---|---|---|
| 2,003,488 | 6/1935 | Hook | 29—479 X |
| 2,525,680 | 10/1950 | Ingemarson | 269—48.1 X |
| 2,830,551 | 4/1958 | Miller | 269—48.1 X |

JOHN F. CAMPBELL, *Primary Examiner.*